Patented Nov. 9, 1948

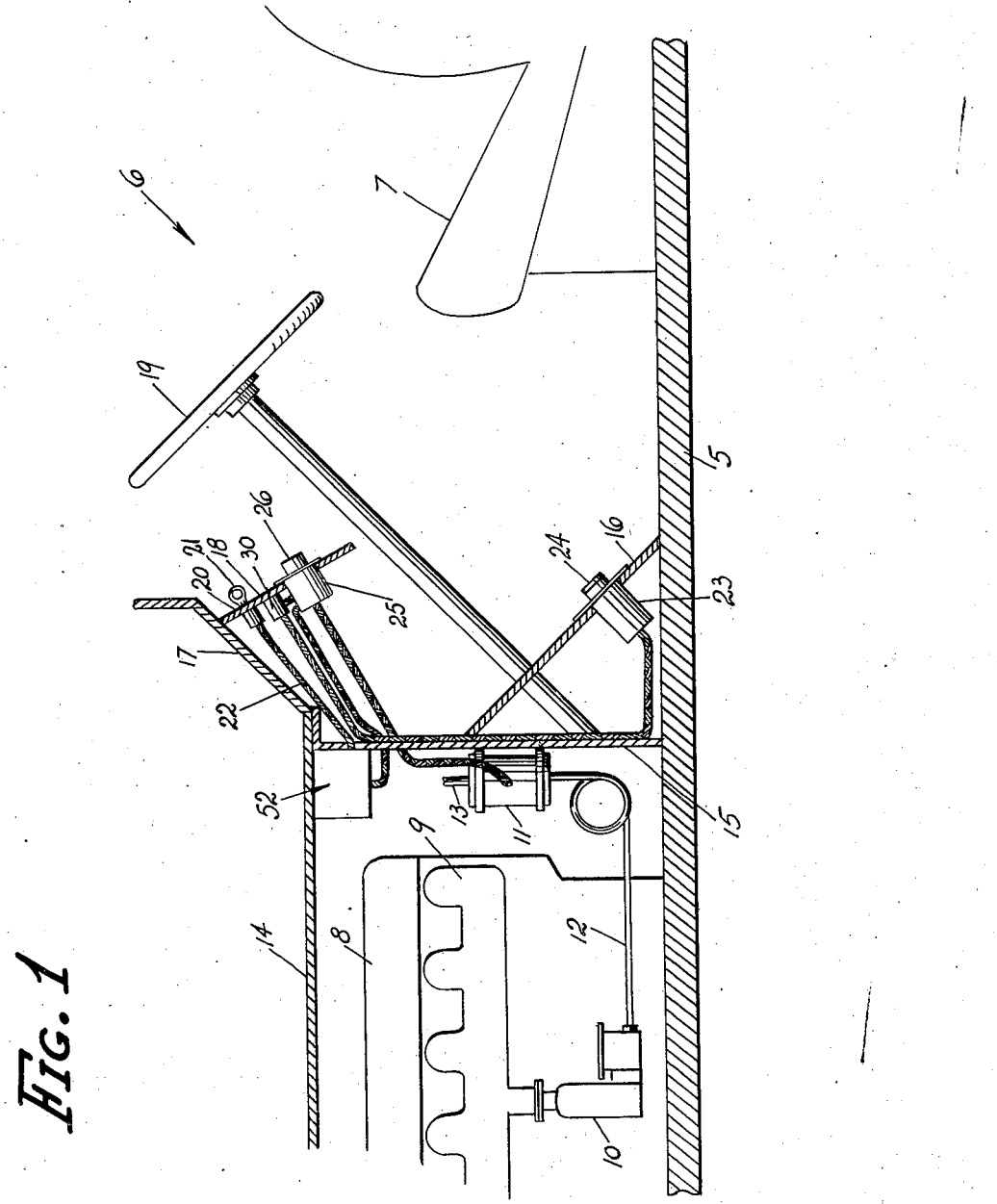

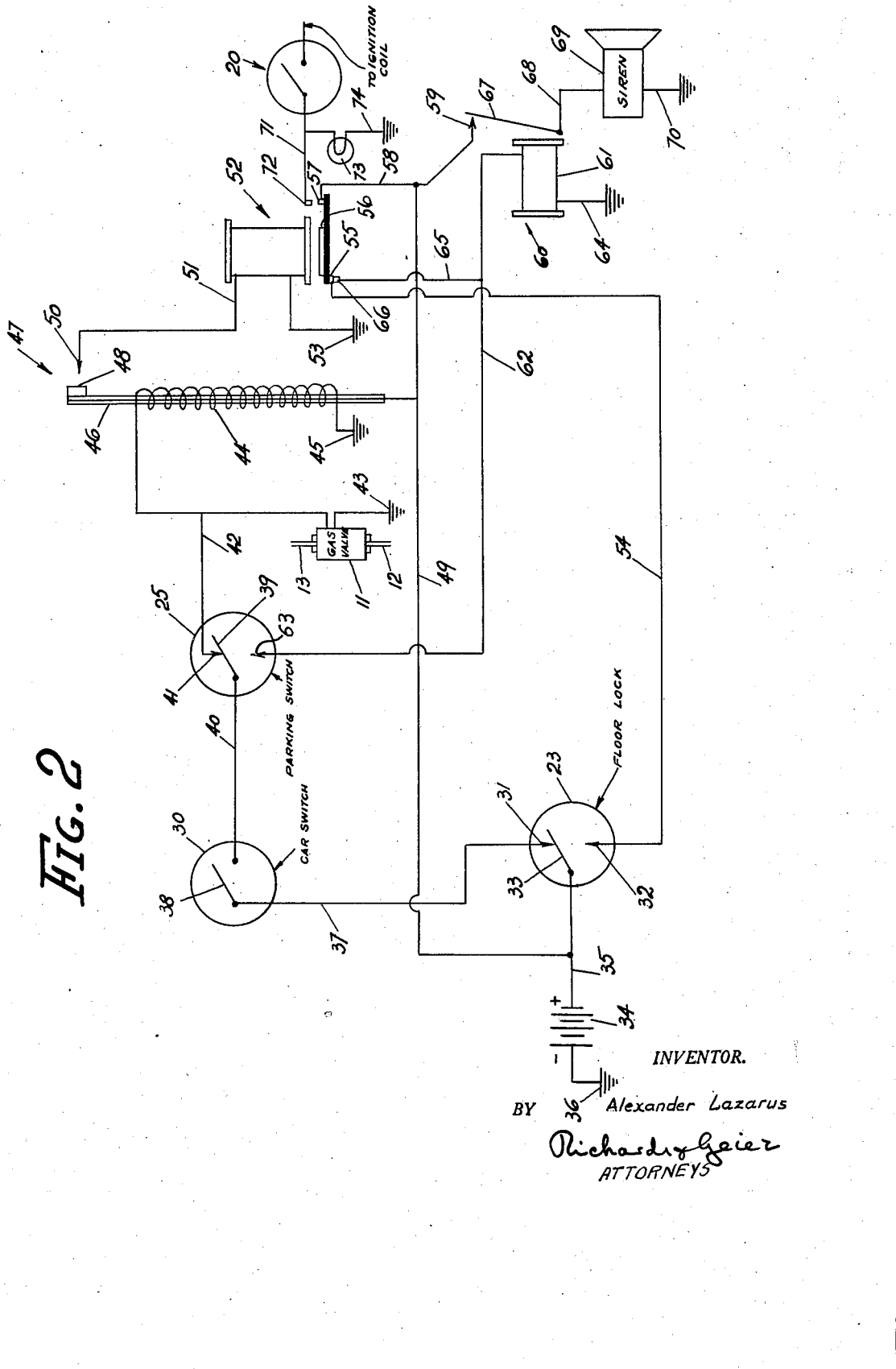

2,453,236

UNITED STATES PATENT OFFICE 2,453,236

THEFT-PREVENTING LOCKING DEVICE FOR AUTOMOBILES AND THE LIKE

Alexander Lazarus, Rosedale, N. Y.

Application May 23, 1946, Serial No. 671,868

5 Claims. (Cl. 177—314)

1

This invention relates to anti-hi-jacking devices for preventing the stealing of automobiles, trucks and similar vehicles either when such vehicles are in operation or when parked, said devices being similar in some respects to those shown in Patent No. 2,022,725 upon which the present invention is an improvement.

It is an object of the present invention to provide an improved locking device for automobiles and the like, which will lock the car against theft while in operation and set an audible alarm or siren in action when an attempt is made to drive said car by an unauthorized person.

Another object of the invention is to provide similar means for the prevention of stealing a parked automotive vehicle.

A further object of the invention is to provide a device for preventing the theft of motor vehicles which may be readily driven by the thief for a short space of time and/or distance, at the expiration of which the vehicle will cease to run and the alarm will commence to operate.

A still further object of the invention is to provide such anti-hi-jacking means which may readily be pre-set into operative position without detection by the person attempting the stealing or hi-jacking of the vehicle.

Another object is to produce a device of the character described in which the maximum simplicity of construction and operation is secured.

Other objects and advantages will appear as the nature of the improvements is better understood, the invention consisting substantially in the novel arrangement and corelation of parts herein fully described, and illustrated in the accompanying drawings, wherein similar reference characters are used to denote corresponding parts throughout the several views, and then finally pointed out and specifically defined in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In carrying out a preferred embodiment of the invention it was found desirable to provide a foot operated lock which is electrically connected to an electrically controlled gas valve, which when the lock is depressed will cut off the fuel supply. The depression of the lock also causes a siren to be cut into the circuit and operate.

It was also found advantageous to provide a parking lock similarly connected to the gas valve and siren which when depressed, and an attempt is made to operate the car by closing the car switch, will cut in the siren and cause same to operate.

It was further found that by electrically connecting the floor lock, car switch, parking lock and gas valve in series, the gas supply will cease when either one of the locks is depressed or the car switch opened.

In the drawings:

Figure 1 is a diagrammatic side view of an automotive vehicle in section, showing the application of the present invention thereto; and Figure 2 is a diagrammatic view of the electric wiring.

Referring now to Figure 1 of the drawings, the chassis frame 5 of the automobile is provided with a driver's compartment 6 having a driver's seat 7. Supported on the chassis frame 5 is an engine 8 provided with an intake manifold 9, carburetor 10 to which is connected a solenoid operated valve unit 11 of the type shown and described in said Patent 2,022,725, the said valve being connected at one end to the carburetor by a pipe 12 and is connected at its opposite end to the fuel supply tank not shown by a pipe 13.

The hood 14 encloses the engine 8 and is separated from the driver's compartment by a vertical wall 15. An inclined floor or foot board 16 extends from the dash board or wall 15 towards the driver's seat 7. Extending upwardly from the dash board is a cowl 17 which supports the instrument board 18 positioned close to the steering wheel 19.

The instrument board conveniently carries the usual ignition switch or lock 20 having a key 21 for operating same. The lock 20 is provided with a tubular enclosure 22 housing its electrical connections.

The construction thus far described is conventional and forms no part of the present invention.

In the present invention there is suitably positioned on the floor or foot board 16, a switch or lock 23 having a depressible plunger 24. A similar lock 25 having a plunger 26 is mounted on the instrument board 18. Both the locks 23 and 25 are single pole, double throw switches and are identical one with the other, with the exception that their key tumblers are different and may be of the same general mechanical construction as the lock 29 of the said Patent 2,022,725 and are therefore not here described in detail. The instrument board 18 also supports a single pole single throw switch 30.

By referring now to the wiring diagram shown in Figure 2, the electrical connections will become readily apparent. The anti-hi-jacking or floor lock 23 is provided with an upper electrical contact 31, a lower contact 32 and contact plate 33 connected to the positive pole of the battery 34 by means of a lead wire 35, the battery being connected to ground 36. The upper contact 31 is electrically connected by means of a wire 37 to the switch arm or pole piece 38 of the switch 30. The switch 30 is connected to the switch arm 39 of the parking lock switch 25 by a wire 40 and the upper contact 41 of the said switch is connected by a wire 42 to solenoid operated gas valve 11 one connection thereof being grounded at 43. The wire 42 further connects the switch contact 41 to one end of a heating coil 44 which is grounded at 45. The heating coil 44 surrounds a bi-metal member 46 of a thermostat 47. The member 46 is provided at one end with a contact 48 and is electrically connected at its opposite end to a wire 49 leading from the battery wire 35. The thermostat further includes a contact 50 at one end of a solenoid winding 51 of an electro magnet 52 the opposite end of said winding or coil being grounded 53. The bi-metal strip 46 is also connected to the wire 49 leading from the battery 34.

The electric switch terminal or contact 32 has a wire 54 leading therefrom to a contact 55 at one end of an armature 56 of the electro magnet 52. The opposite end of the armature 56 has a contact 57 connected to the wire 49 by a wire 58 which is also electrically connected to a contact 59 of a relay 60 comprising a magnetic coil 61 connected by a wire 62 to a contact 63 of the parking switch 25, the said coil 61 being grounded at 64. The wire 62 is electrically connected by a wire 65 to a contact 66 opposite the armature contact 55. The relay 60 also includes an armature 67 connected by a wire 68 to the coil of an audible signal in the form of a siren 69 grounded at 70. The ignition switch 20 is electrically connected by a wire 71 to contact 72 of the relay 52 and has a pilot light 73 in circuit therewith, the said pilot light being grounded at 74. All of the grounds enumerated may be commonly connected to the chassis 5.

The operation of the device is as follows:

To start the car, the car switch 30 is closed thus permitting current from the battery 34 to flow through the switch arm 33 of the floor lock 23, car switch 30, connections 40, 39, 41, 42 to maintain the gas valve 11 open to supply gasoline to the carburetor, electric current also flows through the heating coil 44 which after a delay of approximately thirty seconds warps the bimetal arm 46 closing the contacts 48 and 50 to energize the electro magnet 52 to pull the armature 56 and close the circuit between contacts 57 and 72 thus lighting the pilot light 73 and sending current through the ignition switch to the ignition coil not shown.

If now any attempt is made to hi-jack the car while in operation the lawful driver merely depresses the plunger 24 of the floor lock 23 thus moving the switch arm 33 on said lock from contact with the contact 31 and connecting same with the lower contact 32. In so doing the gas valve is cut out of circuit as well as the bi-metal arm 46 which when cooled off breaks contact between contacts 48 and 50 de-energizing the coil 52 permitting the armature 56 to drop and break the circuit to the ignition coil and pilot light. The contacting of the arm 33 with the floor lock contact 32 sends current from the battery through the wire 54 through the contacts 55—66, wires 65—62 to the relay 60 which becomes energized to close the contact between the contact 59 on the battery wire 49 and the armature 67 leading to the siren 69 and operate same.

Before parking the car, the car switch 30 is opened and the parking lock is depressed. Should any one now attempt to steal the car by closing the switch 30, then current will flow from the battery through wires 35, 37, switch 30, wire 40 switch arm 39 wire 62 to ground 64 energize the electro magnet of relay 60 close the contacts 59 and 67 back to the battery through wire 49 and operate the siren 69.

From the foregoing it will be seen that with the arrangement above described, the depression of either floor lock or parking lock, the gas valve is operated to shut off the supply of fuel to the carburetor and engine and simultaneously therewith sets a siren or other similar audible alarm into operation to warn the police that an attempt is being made to steal the car.

It will also be noted that the setting of the floor lock cannot be detected by any one attempting to steal the car which will run for a short distance after the setting or depression of the lock incidental to a hi-jacking attempt.

What is claimed is:

1. In an automotive vehicle having an engine, a liquid fuel supply therefor, and an ignition switch; the combination therewith of an anti theft device, said device comprising an electric circuit including a source of current supply, a two contact foot operated switch normally closed through one of said contacts, a manually operated switch, the said switches being connected in series in said circuit, a fuel valve electrically controlled by said switches, a single pole, single throw, normally open bi-metal strip connected to the source of current supply, a heating coil surrounding the said bi-metal strip and connected in series with said switches, a double pole, single throw, normally open electromagnet adapted to be energized when the bi-metal strip becomes heated in the normal operation of the vehicle to complete a circuit through one set of said poles to the ignition switch, an audible signal device and a single pole, single throw relay connected to the source of current supply normally in open circuit with the audible signal device and adapted to be energized by said double pole, single throw, normally open relay to complete the circuit through the audible signal device when the circuit is broken through the first mentioned foot operated switch contact and completed through the second contact.

2. In an automotive vehicle having an engine, a liquid fuel supply therefor, and an ignition switch; the combination therewith of an anti theft device, said device comprising an electric circuit including a source of current supply, a two contact foot operated switch normally closed through one of said contacts, a manually operated switch, the said switches being connected in series in said circuit a fuel valve electrically controlled by said switches, a thermostat in the switch circuit, a double pole, single throw electro magnet normally in open circuit with the thermostat and adapted to be energized when the said thermostat becomes heated in the normal operation of the vehicle to complete a circuit through one set of contacts to the ignition switch, an audible signal device, and a single pole, single throw relay connected to the source of current supply normally in open circuit with the audible signal device and adapted to be energized by said double pole, single throw, normally open relay to complete the circuit through the audible signal device when the circuit is broken through the first mentioned foot operated switch and completed through the second contact.

3. In an automotive vehicle having an engine, a liquid fuel supply therefor, and an ignition switch; the combination therewith of an anti theft device, said device comprising an electric circuit including a source of current supply, a switch connected to the source of current supply and closed when the vehicle is being driven and open when parked, a parking switch including an arm connected in series with said switch connected to the source of current supply, a contact which the said arm normally engages to close the circuit when the vehicle is being driven, a fuel valve electrically controlled through said contact to feed fuel to the engine when said contact is closed, a second contact on said parking switch, an audible signal device and a single pole, single throw relay connected to the said second contact and source of current supply, said relay being normally in open circuit with the audible signal device and adapted to be energized to complete the circuit through the audible signal device when the circuit is broken through the first contact and completed through the second contact and the first mentioned switch is closed.

4. In an automotive vehicle having an engine, a liquid fuel supply therefor, and an ignition switch; the combination therewith of an anti theft device, said device comprising an electric circuit including a source of current supply, a foot operated switch, a contact arm on said switch connected to the source of current supply, a contact on said switch normally contacted by the contact arm, a manually operated switch connected to said contact, a parking switch including an arm connected in series to the manually operated switch, a contact which the said arm normally engages to close the circuit when the vehicle is being driven, a fuel valve electrically controlled through said contact, to feed fuel to the engine when said contact is closed, a thermostat in the switch circuit, double pole, single throw electromagnet normally in open circuit with the thermostat and adapted to be energized when the said thermostat becomes heated in the normal operation of the vehicle to complete a circuit through one set of contacts to the ignition switch, an audible signal device, a single pole, single throw relay connected to the source of current supply through contacts of said double pole, single throw electromagnet normally in open circuit with the audible signal device when the circuit is broken through the first mentioned foot operated switch contact and completed through the second contact, and a second contact on the parking switch connected to the relay for energizing same to operate the audible signal device when the said parking switch arm breaks engagement with its first contact and engages the second contact and the manually operated switch is closed.

5. In an automotive vehicle having an engine, a liquid fuel supply therefor, and an ignition switch, the combination therewith of an anti-theft device comprising an electric circuit, current supply for said circuit, a double pole, double throw, normally closed foot operated switch, manually operated switch connected in series with said foot operated switch, a fuel valve electrically controlled by said switches adapted to be open under normal driving conditions, a single pole, single throw bi-metal strip connected to the source of current supply under normal driving conditions, a heating coil surrounding said bi-metal strip and connected in series with said switches, a double pole, single throw electromagnet adapted to be energized when the bi-metal strip becomes heated closing the said single pole, single throw contact thereto in the normal operation of the vehicle, one set of contacts of said double pole, single throw electromagnet adapted under normal operation to complete circuit through to said ignition switch, an audible signal device and a single pole, single throw relay connected to the source of current supply normally in open circuit with the audible signal device and adapted to be energized by one set of contacts of said double pole, single throw electromagnet when open to complete the circuit through the audible signal device when the circuit is broken through said foot operated switch normally closed contact and completed through second contact thereof.

ALEXANDER LAZARUS.

REFERENCES CITED

The following references are of record in the file of this patent:

UNITED STATES PATENTS

| Number | Name | Date |
| --- | --- | --- |
| 1,131,824 | Cline et al. | Mar. 16, 1915 |
| 1,257,259 | Leslie | Feb. 19, 1918 |
| 1,364,048 | Gilland | Dec. 28, 1920 |
| 2,205,104 | May | June 18, 1940 |